United States Patent [19]
Kramer

[11] Patent Number: 5,627,342
[45] Date of Patent: May 6, 1997

[54] OPEN AND CLOSE-ENDED GROMMETS HAVING ONE OR MORE FLANGE CUT-OUT AND CREASE-MARKS FOR FURTHER FLEXIBILITY IN THEIR ATTACHMENT TO APERTURES OF METAL STUDS OR PANELS

[76] Inventor: Hy Kramer, 1457 Bassett Ave., Bronx, N.Y. 10461

[21] Appl. No.: 551,822

[22] Filed: Nov. 7, 1995

[51] Int. Cl.$^6$ .................................................. H02G 3/22
[52] U.S. Cl. ........................... 174/65 G; 174/152 G; 174/153 G; 248/56
[58] Field of Search ................. 174/48, 153 G, 174/65 G, 152 G; 248/56; 16/2; 439/460, 464, 606

[56] References Cited

U.S. PATENT DOCUMENTS

| | | | |
|---|---|---|---|
| 3,057,001 | 10/1962 | Rapata | 16/2 |
| 3,372,411 | 3/1968 | Fisher | 441/81 |
| 3,372,441 | 3/1968 | Fisher | 16/2 |
| 3,372,962 | 3/1968 | Fisher | 16/2 |
| 4,050,205 | 9/1977 | Ligda | 52/357 |
| 4,289,924 | 9/1981 | Pearle, Jr. | 174/152 G |
| 4,299,363 | 11/1981 | Datschefski | 248/56 |
| 4,588,853 | 5/1986 | Confer | 174/48 |
| 4,860,791 | 8/1989 | Putnam | 248/56 X |
| 5,117,537 | 6/1992 | Hunter | 24/72.5 |
| 5,442,141 | 8/1995 | Gretz | 174/153 G |
| 5,488,198 | 1/1996 | Kramer | 174/48 |

Primary Examiner—Kristine L. Kincaid
Assistant Examiner—Paramita Ghosh
Attorney, Agent, or Firm—M. G. Marinangeli, Esq.

[57] ABSTRACT

The present invention relates to an improved grommet for protecting wires and tubes that must be placed thru apertures in building panels or studs made of steel or the like. The grommet disclosed here includes a single piece, soft plastic body having any configuration, (e.g. polygonal, round, oval, semi-circle, or even polygonal with curved edges) which is flanged along its periphery. On one side of the outer surface of grommet body's wall are arranged one or more protruding, male nubs which securely hold, in the gap formed between the wall flange and said male nubs, the rims of the aperture in a metal stud. Due to its larger than aperture size, which includes one or more openings and cut-outs in its flange, one or more crease-marks in its body wall, and whose body can be either open-ended or close-ended, the grommet disclosed herein has increased flexibility when it is pinched in along the sides of it's body's wall, and upon release an improved outward pressure is achieved against the rims of the stud aperture. The protruding male nubs in relation to the wall flange allows this device to remain firmly attached to the aperture rims once attached thereto. This improved grommet can be used to protect wires on any stud aperture, and due to its soft plastic material, together with the combination of flange cut-outs, and crease-marks, its increase flexibility will cause the grommet to approach the shape of the stud aperture it is to be attached to.

15 Claims, 3 Drawing Sheets

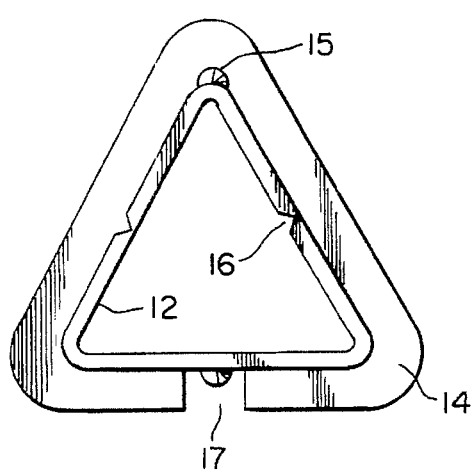
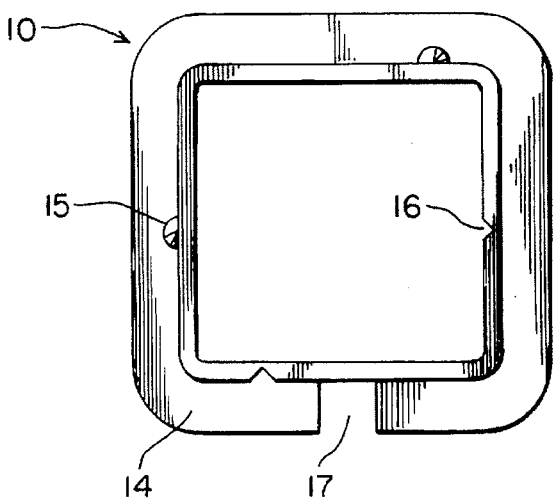
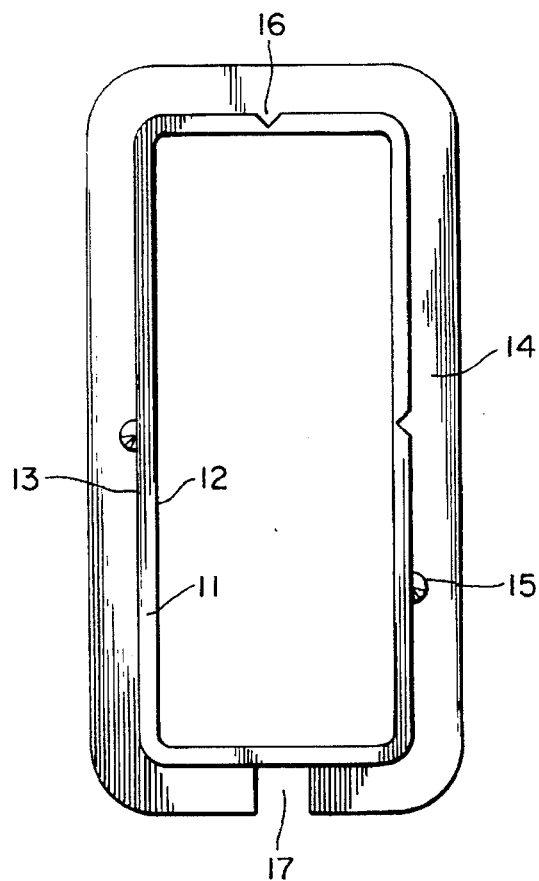
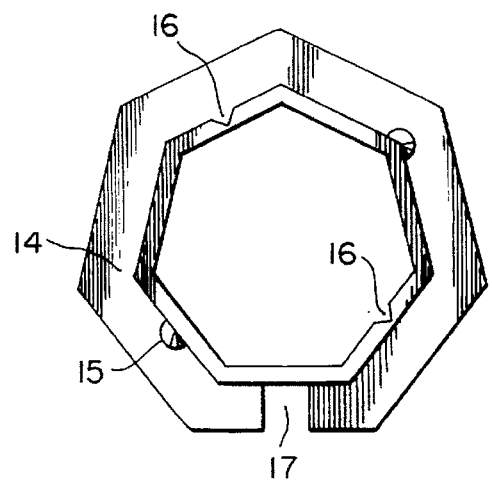
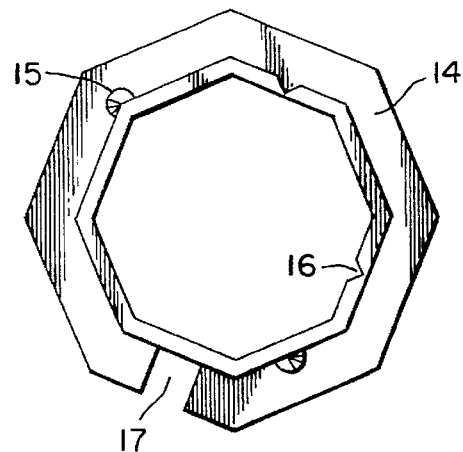

5,627,342

OPEN AND CLOSE-ENDED GROMMETS HAVING ONE OR MORE FLANGE CUT-OUT AND CREASE-MARKS FOR FURTHER FLEXIBILITY IN THEIR ATTACHMENT TO APERTURES OF METAL STUDS OR PANELS

FIELD AND BACKGROUND OF THE INVENTION

The present invention generally relates to an improved new grommet for apertures or openings in studs or panels. Particularly, the present application discloses further patentable improvements over those in the grommet which was disclosed in the recently allowed patent application Ser. No. 08/299,590 now U.S. Pat. No. 5,488,198. More specifically, the present disclosure is to a single piece, soft plastic device which is flexible and is designed so it can be easily attached to an apertured stud made of steel or the like. The improvement of the present application is that there are one or more notches or crease-marks either along the inner and/or outer wall surfaces of the grommet, which allow for a firm and effective attachment to apertures in a flexible manner. In addition, there are one or more cut-outs along its flange. This improved grommet also has one or more male nubs protruding from along its outer wall surface, adjacent to its flange, for attaching the rim of the aperture opening therebetween. Along the flange and adjacent to the male nubs are also one or more openings which allow for ease of manufacture by eliminating the need of a cam mold. The flange cut-outs, the wall crease-marks, and the male nubs can be used in separate combinations, i.e. 2 cut-outs, 2 cut-outs, 2 wall crease-marks, and 2 male nubs, or 4 cut-outs, 1 wall crease-marks, and 6 male nubs, or 1 cut-out, 12 wall crease-marks, and 3 male nubs. This improved grommet, which can have a polygonal, round, oval, or semi-circle configuration will be attachable to any shape of stud aperture, and due to its soft plastic material, together with the combination of flange cut-outs, and crease-marks in its body, its increased flexibility will cause the grommet to approach the shape of the stud aperture it is to be attached to.

There are presently generally known various grommets or protective devices but they all present various inconveniences and setbacks which are overcome by the inventive yet inexpensively effective device that is disclosed herein.

Illustrative prior art includes U.S. Pat. No. 3,057,001 which discloses a Strain Relief Grommet. The grommet is attached to an apertured panel by inserting a shank portion into the panel aperture and engaging the backside of the panel by shoulders on the shank portion. At least one of the shoulders which engages the backside of the panel is on a flexible finger which is collapsed and then expanded as the shank portion is inserted into the panel aperture. Another prior patent, U.S. Pat. No. 4,289,924 discloses a hard plastic grommet made of two hard plastic shells which are arranged around a bundle of cables and which must additionally be injected with a sealant. Finally, in U.S. Pat. No. 5,117,537, is disclosed a clip device for being removably secured to a marginal edge portion of a sheet of flexible material. Unlike the above devices, the present device is a single, easily molded piece, which can be attached to a panel aperture without the use of sealants or other costly attaching means. The applicant herein, owner of Ser. No. 08/299,590 now U.S. Pat. No. 5,488,198, which was granted a Notice Of Allowance dated Sep. 18, 1995, submits that although it is the closest prior art, it does not have the improved features disclosed herein. This is due to the added flexibility from the soft plastic shaped body and the combination of one or more male nubs, openings and crease-marks added to the grommet's body surface. Other prior art patents cites in this earlier patent by the applicant herein are U.S. Pat. No. 3,372,441 to Fisher in 1968, U.S. Pat. No. 3,372,962 to Fisher in 1968, U.S. Pat. No. 4,050,205 to Ligda in 1977, U.S. Pat. No. 4,588,853 to Confer in 1986, and U.S. Pat. No. 4,860,791 to Putnam in 1989. All present various drawbacks and design defects that are overcome by the improved grommet disclosed herein.

OBJECTS OF THE INVENTION

The object of this invention is to provide a flexible, single piece, grommet for protecting wires and tubes placed thru apertures in building panels or studs which has a convenient and easy to use design.

A further object of the present invention is to provide an aperture protection device or grommet which is made of flexible plastic for use on apertured studs of panels made of steel or the like.

Another object of the present invention is to provide a grommet having a flanged perimeter and one or more protruding pins or male nubs for securely holding therebetween the rim of the aperture in the metal panel or stud it attaches to without the use of sealants.

A still further object of the invention is to provide a grommet that can be pinched in so as to conveniently fit in most apertured steel panels or studs.

An additional object of the invention is to provide a grommet whose flexibility, when put into the aperture of panels or studs will conform to the aperture, and whose flexibility is due to the softness of the devices' material, including the added flexibility from cut-outs in its flange, notches or crease-marks along its inner and outer wall surface, and an open-ended body.

Another object of the present invention is to provide an improved grommet which can be manufactured in an inexpensive manner yet provide a simple and effective way of attachment to apertures in stud panels.

Other objects and features of the invention will become apparent to those skilled in the art from the following detailed description of one preferred embodiment of the invention as illustrated in the accompanying sheet of drawings wherein like reference numbers identify like parts throughout:

BRIEF DESCRIPTION OF THE DRAWINGS

The present invention will now be described with reference to the accompanying drawings, in which:

FIG. 4 is a bottom perspective view showing a close ended pyramidal shaped grommet with 2 male nubs protruding from its outer wall surface, 1 opening in its flange, and 2 crease-marks in the surface between the inner and outer wall surface.

FIG. 5 is a bottom perspective view showing a close ended square shaped grommet with 2 male nubs protruding from its outer wall surface, 1 opening in its flange, and 2 crease-marks in the surface between the inner and outer wall surface.

FIG. 6 is a bottom perspective view showing a close ended rectangular shaped grommet with 2 male nubs protruding from its outer wall surface, 1 opening in its flange, and 2 crease-marks in the surface between the inner and outer wall surface.

FIG. 7 is a bottom perspective view showing a close ended septagonal shaped grommet with 2 male nubs protruding from its outer wall surface, 1 opening in its flange, and 2 crease-marks in the surface between the inner and outer wall surface.

FIG. 8 is a bottom perspective view showing a close ended octagonal shaped grommet with 2 male nubs protruding from its outer wall surface, 1 opening in its flange, and 2 crease-marks in the surface between the inner and outer wall surface.

DETAILED DESCRIPTION OF THE DEVICE IN A PREFERRED EMBODIMENT

Figure 1:
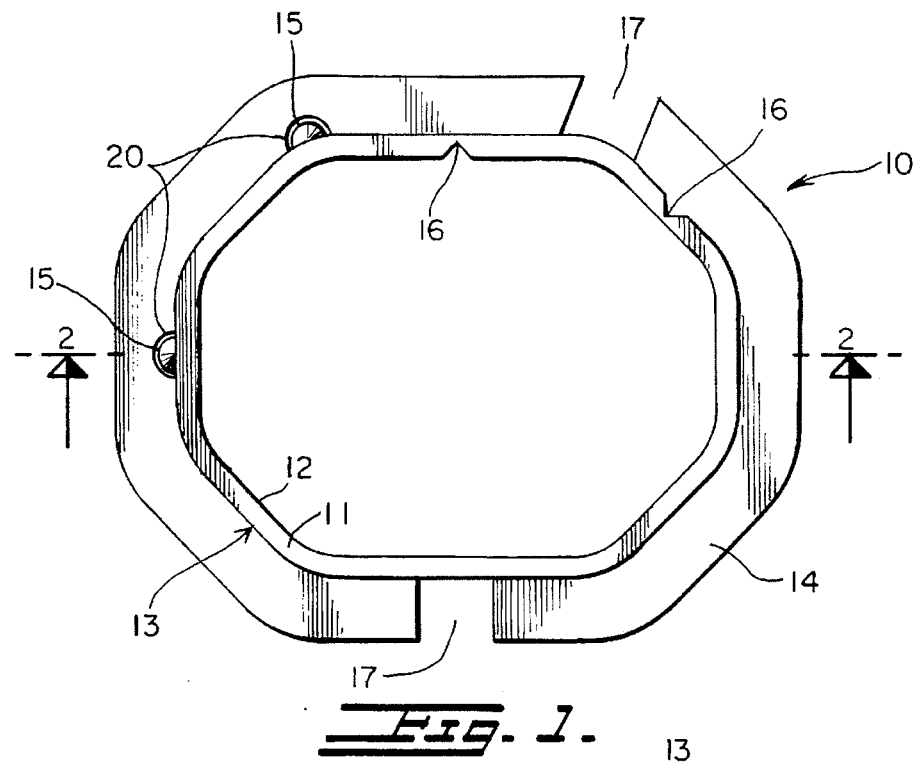
FIG. 1 is a bottom perspective view showing a close ended octagonal shaped grommet with 2 male nubs protruding from its outer wall surface, 2 openings in its flange, 2 crease-marks in the surface between the inner and outer wall surface.

Referring now to the drawings and more particularly to FIG. 1 in which is shown the improved protection device or grommet, in a top perspective view. This grommet, which will eliminate damage to wires and tubes that must be placed thru apertures in metal building panels or studs, comprises a body 10 defined by a wall 11 having inner 12 and outer 13 wall surfaces. Said body 10's wall is flanged along one side of its periphery, and designated as flange 14. In one of the preferred embodiments shown in this application, the body 10 is a single piece, soft plastic body having an octagonal shape. In other embodiments, not shown herein, the body 10 of this device can be of any other polygonal shape such as a pyramid, a square, a pentagon, a hexagon, or can even be round, oval or semi-circular etc. Due to placement of one or more cut-outs 17, along its flange 14, and one or more notches or crease-marks 16 along its wall 11, its greater flexibility, elasticity and larger than aperture size, this polygonal shaped grommet device can be pinched in along the sides of it's body's wall 11, and upon release an outward pressure is achieved against the rims of the stud aperture it is to be attached to.

Figure 3:
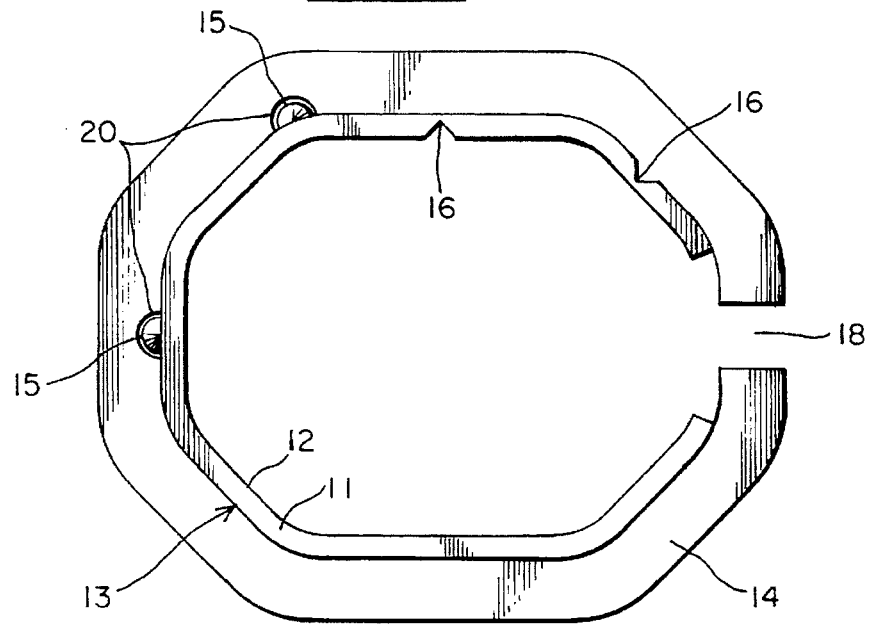
FIG. 3 is a bottom perspective view showing an open ended octagonal shaped grommet with 2 male nubs protruding from its out wall surface, 2 openings in its flange, 2 crease-marks in the surface between the inner and outer wall surface.
Figure 9:
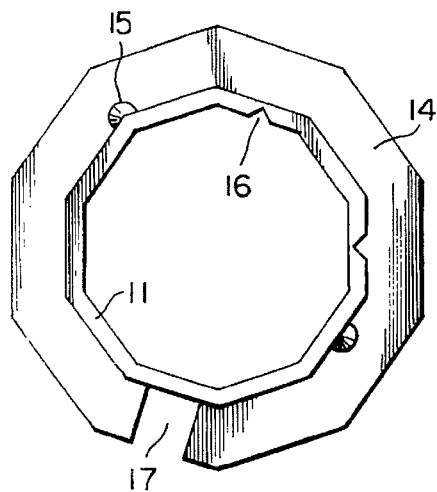
FIG. 9 is a bottom perspective view showing a close ended polygonal shaped grommet with 2 male nubs protruding from its outer wall surface, 1 opening in its flange, and 2 crease-marks in the surface between the inner and outer wall surface.
Figure 10:
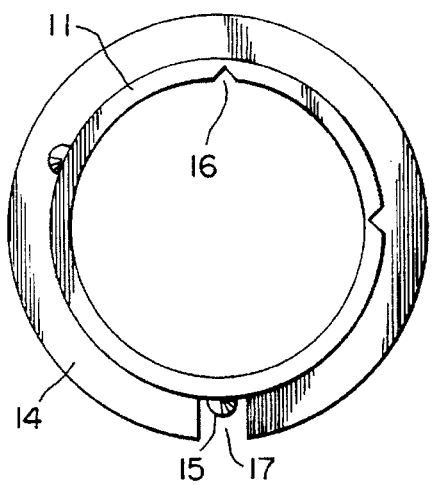
FIG. 10 is a bottom perspective view showing a close ended round shaped grommet with 2 male nubs protruding from its outer wall surface, 1 opening in its flange, and 2 crease-marks in the surface between the inner and outer wall surface.
Figure 11:
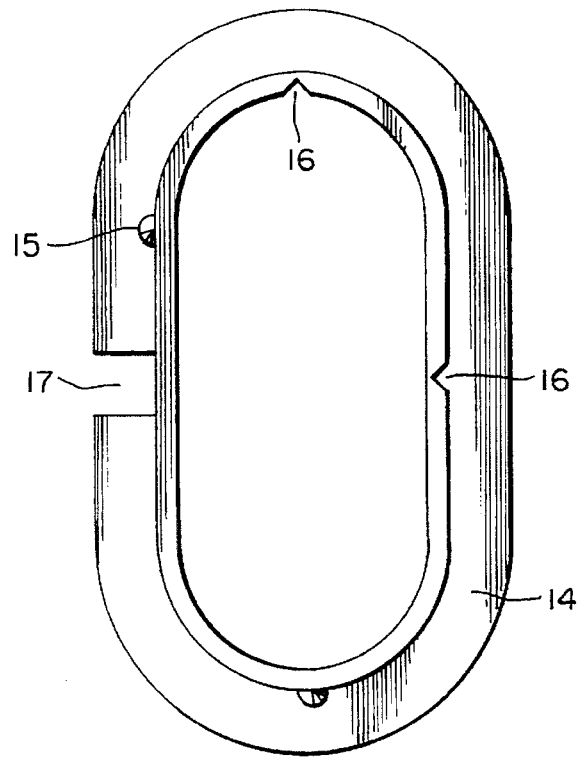
FIG. 11 is a bottom perspective view showing a close ended oval shaped grommet with 2 male nubs protruding from its outer wall surface, 1 opening in its flange, and 2 crease-marks in the surface between the inner and outer wall surface.

A flange 14 is formed around the periphery of said wall 11. As can be seen in FIG. 1, showing a close-ended grommet, and as can be seen in FIG. 3 showing an open-ended grommet having an opening 18, two male nubs 15 protrude from various positions along the sides of the outer wall surface 13 of said body 10 so as to face said flange 14, at a predetermined distance, thereby defining a gap 19 between said nubs 15 and said flange 14 for receiving, therebetween, the rims of an aperture in a metal stud. As they protrude from the outer wall surface 13, the nubs 15 are angled toward the flange 14 so as to form an angle at the point of intersection with outer wall surface 13. This particular structure allows for the protection device to be firmly attached to the rims of an aperture in metal stud. Although the protection device 10 shown in the drawings herein has two male nubs 15 protruding from the sides of the outer wall surface 13 of said body 10, any number of said male nubs 15 can be used depending on the exact size and dimensions of the manufactured protection device. In addition, although the flange 14 of the particular polygonal grommet shown has only 2 cut-outs 17, any number of cut-outs, from one or more, can be made in the flange 14. These cut-outs 17, which can be used in various combinations from one or more with the crease-marks 16, allow for additional flexibility when attaching the improved grommet to different shaped and sized stud apertures.

Figure 2:
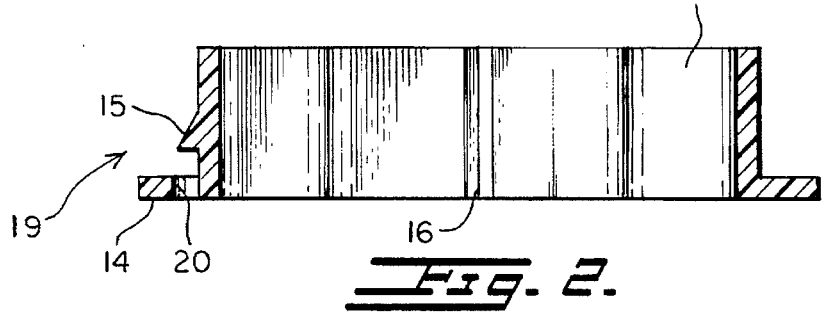
FIG. 2 is a view taken through 2—2 of FIG. 1 showing the area in the aperture protection device that can receive in the gap between its protruding male nub and its flange the rim of the aperture in the stud or panel. Also shown on the flange is an opening adjacent to the male nub for ease of manufacture and for additional flexibility.

FIG. 2 is a view taken through 2—2 of FIG. 1 showing the area in the grommet 10 that can receive in the gap 18 between its protruding male nub 15 and its flange 14, the rim of the aperture in the stud or panel. A side view of a crease-mark 16 is also shown in FIG. 2, and just like the male nubs 15 and the cut-outs 17, although only two are shown in the embodiment disclosed, one or more can be used on the polygonal shaped grommet disclosed herein, depending on the exact amount of flexibility needed for attaching firmly thereto a particular shaped aperture in a metal stud or panel. Also shown in FIG. 2 is an opening 20, in the flange 14, which is adjacent to the male nub 15. The exact number of openings 20 depends on the number of male nubs 15 that are to be arranged on the grommet wall 11. The openings 20 allow for more cost effective manufacture because of the elimination of the need of using a cam mold to make a grommet for a panel aperture. As with the male nubs 15, the crease-marks 16, and the flange cut-outs 17, one or more openings 20 can be made in the flange 14 depending solely on how man male nubs are needed.

As generally noted above, the body 10 of this improved grommet can have any number side from three of more as long as it is larger than the particular stud aperture it is to attach to by way of the simple pinching in of the sides of the body's wall 11 and upon release an outward pressure is achieved against the rims of the stud aperture. The design and angle of protruding male nubs 15 in relation to the wall flange 14 allows this device to remain firmly attached to the stud aperture once it is attached thereto.

FIG. 3 is the same view of the grommet shown in FIG. 1 but showing another preferred embodiment wherein it has an open-end 18 on one side of the grommet body 10. This open-end 18, together with a combination of wall crease-marks 16 and flange cut-outs 17, gives this improved grommet and increased flexibility when being attached to all shapes and sizes of apertures in studs and panels.

Figure 12:
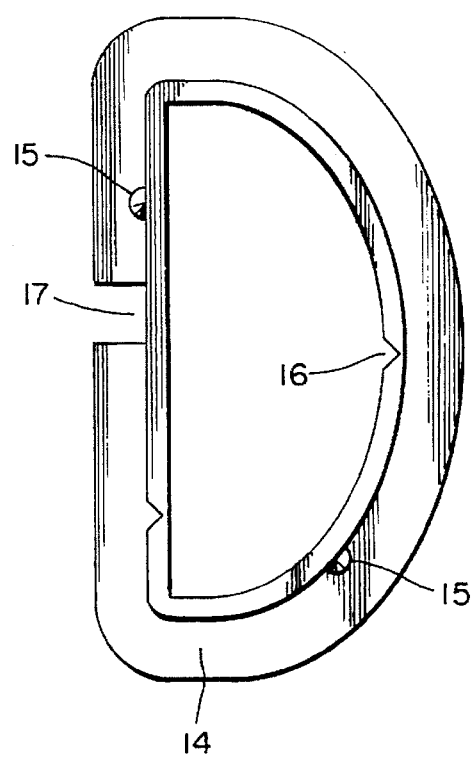
FIG. 12 is a bottom perspective view showing a close ended semi-circle shaped grommet with 2 male nubs protruding from its outer wall surface, 1 opening in its flange, and 2 crease-marks in the surface between the inner and outer wall surface.

In FIGS. 4–12 are also shown the same view of the grommet device shown in FIG. 1 which is close ended and having the particular shapes claimed in claims 3–5 and 7–12, i.e. a pyramidal or triangular shaped grommet (claim 3—FIG. 4); a square shaped grommet (claim 4—FIG. 5); a rectangular shaped grommet (claim 5—FIG. 6); a septagonal shaped grommet (claim 7—FIG. 7); an octagonal shaped grommet (claim 8—FIG. 8); a polygonal shaped grommet (claim 9—FIG. 9); a round shaped grommet (claim 10—FIG. 10); an oval shaped grommet (claim 11—FIG. 11); and a semi-circle shaped grommet (claim 12—FIG. 12). Although in each of these preferred embodiments of the different shaped grommets there are shown two male nubs 15, two crease-marks 16 and one flange (14) cut-out or opening 17, it should be understood that the inventor does not limit his improved grommet invention to these specific structures because the claimed invention is to "one or more" male nubs 15, crease-marks 16 and flange cut-outs 17 arranged in varying positions along the grommet body 10.

Although simple in operation and inexpensive to manufacture, there is no prior art which anticipates or makes obvious the present flexible plastic, single piece, grommet which has one or more male nubs 15, openings 20, crease-marks 16 and flange cut-outs 17—all in various combinations. This cost effective yet utilitarian device will protect wires and tubes, placed thru apertures in building panels or studs made of metal or the like, from damage and costly replacement.

Since the invention is described and illustrated with reference to but a single preferred embodiment, and since numerous modifications and changes may become readily apparent to those skilled in the art after reading this disclosure, it should be understood that I do not wish to limit the scope of my invention to the exact construction shown and described above, and as claimed by me below.

What is claimed by me is:

1. A grommet device for wires and tubes which is attached along rims of an aperture in metal studs comprising:

a body made of a flexible plastic material defined by a wall having an inner and outer wall surface, wherein the body can be pinched into attachment with an aperture in a metal stud;

one or more crease-marks arranged along the inner wall surface;

one or more crease-marks arranged along the outer wall surface;

a flange, said flange is formed around the periphery of said wall;

one or more cut-outs are arranged along the flange;

one or more male nubs protrude from the outer wall surface of said body thereby defining a gap between said nubs and said flange for receiving, therebetween, the rims of the aperture in the metal stud; and one or more openings on the flange opposing the one or more male nubs that protrude from the outer wall surface of said body, wherein said wall crease-marks, said flange cut-outs, and said one or more male nubs can be arranged on the body in various combinations.

2. Device in accordance with claim 1 wherein the wall has a gap therein defining an opening thus adding flexibility to the entire protection device when it is attached to apertures in metal studs of varying configurations.

3. Device in accordance with claim 1 wherein the body is pyramidal shaped.

4. Device in accordance with claim 1 wherein the body is square shaped.

5. Device in accordance with claim 1 wherein the body is rectangular shaped.

6. Device in accordance with claim 1 wherein the body is hexagonal shaped.

7. Device in accordance with claim 1 wherein the body is septagonal shaped.

8. Device in accordance with claim 1 wherein the body is octagonal shaped.

9. Device in accordance with claim 1 wherein the body is a polygonal shape having more than eight sides.

10. Device in accordance with claim 1 wherein the body is round.

11. Device in accordance with claim 1 wherein the body is oval.

12. Device in accordance with claim 1 wherein the body is a semi-circle.

13. A grommet device for wires and tubes which is attached along rims of an aperture in metal studs comprising:

a body made of a flexible plastic material defined by a wall having an inner and outer wall surface, wherein the body can be pinched into attachment within an aperture in a metal stud;

one or more crease-marks arranged along the inner wall surface;

one or more crease-marks arranged along the outer wall surface;

a flange, said flange is formed around the periphery of said wall;

one or more cut-outs are arranged along the flange;

one or more male nubs protrude from the outer wall surface of said body thereby defining a gap between said one or more male nubs and said flange for receiving, therebetween, rims of the aperture in the metal stud; and one or more cut-outs along the flange, wherein said wall crease-marks, said flange cut-outs, and said one or more male nubs can be arranged on the body in various combinations.

14. Device in accordance with claim 13 wherein the wall has a gap defining a wall opening and the wall has ends on either side of the wall opening arranged so that said ends can pass over each other thus adding flexibility to the entire protection device when it is attached to apertures in metal studs of varying configurations.

15. Device in accordance with claim 14 wherein one or more openings are arranged on the flange opposing the one or more male nubs that protrude from the sides of the outer wall surface of said body.

* * * * *